United States Patent
Smith et al.

(10) Patent No.: US 7,339,725 B2
(45) Date of Patent: Mar. 4, 2008

(54) OPTICAL TRANSMISSION SYSTEMS INCLUDING OPTICAL AMPLIFIERS AND METHODS OF USE THEREIN

(75) Inventors: David F. Smith, Ellicott City, MD (US); Thomas D. Stephens, Brighton (AU)

(73) Assignee: Broadwing Corporation, Austin, TX (US)

( * ) Notice: Subject to any disclaimer, the term of this patent is extended or adjusted under 35 U.S.C. 154(b) by 0 days.

(21) Appl. No.: 11/799,804

(22) Filed: May 3, 2007

(65) Prior Publication Data

US 2007/0247703 A1 Oct. 25, 2007

Related U.S. Application Data

(60) Division of application No. 11/415,261, filed on May 1, 2006, now Pat. No. 7,215,463, which is a continuation of application No. 10/336,929, filed on Jan. 6, 2003, now abandoned, which is a continuation of application No. PCT/US01/21471, filed on Jul. 6, 2001.

(60) Provisional application No. 60/216,114, filed on Jul. 6, 2000.

(51) Int. Cl.
  *H01S 3/00* (2006.01)
(52) U.S. Cl. .................................... 359/337.4
(58) Field of Classification Search ............. 359/337.4
  See application file for complete search history.

(56) References Cited

U.S. PATENT DOCUMENTS

| | | | |
|---|---|---|---|
| 5,173,957 A * | 12/1992 | Bergano et al. | 385/24 |
| 5,355,248 A * | 10/1994 | Hadjifotiou | 359/341.3 |
| 5,408,348 A * | 4/1995 | Pamart et al. | 398/160 |
| 5,696,615 A | 12/1997 | Alexander | |
| 5,764,405 A * | 6/1998 | Alphonsus | 359/341.33 |
| 5,798,855 A * | 8/1998 | Alexander et al. | 398/34 |
| 6,057,951 A | 5/2000 | Sugawara | |
| 6,115,174 A | 9/2000 | Grubb et al. | |
| 6,236,487 B1 | 5/2001 | Stephens | |
| 6,396,623 B1 | 5/2002 | Wysoki et al. | |
| 6,577,789 B1 | 6/2003 | Wang | |
| 6,583,922 B2 | 6/2003 | Srikant et al. | |
| 6,583,923 B1 | 6/2003 | Rapp | |
| 6,850,360 B1 | 2/2005 | Chen et al. | |
| 6,879,434 B2 | 4/2005 | Aoki et al. | |
| 7,046,429 B2 | 5/2006 | Halevi et al. | |

(Continued)

FOREIGN PATENT DOCUMENTS

EP 0 476 830 3/1992

(Continued)

OTHER PUBLICATIONS

International Search Report for International Application No. PCT/US01/21471.

(Continued)

*Primary Examiner*—Deandra M Hughes

(57) ABSTRACT

Optical transmission systems including a plurality of optical amplifiers configured to provide optical amplification of one or more information carrying optical signal wavelengths. At least two of the optical amplifiers are operated to provide net losses or net gains along corresponding spans, while the cumulative gain provided by the plurality of optical amplifiers substantially compensates for the cumulative loss of the spans.

6 Claims, 4 Drawing Sheets

U.S. PATENT DOCUMENTS

| | | |
|---|---|---|
| 7,046,431 B1 | 5/2006 | Sugaya et al. |
| 7,133,196 B1 | 11/2006 | Lee et al. |
| 7,139,489 B2 | 11/2006 | Nissov et al. |
| 2002/0080447 A1* | 6/2002 | Fells et al. .................. 359/141 |
| 2002/0163683 A1 | 11/2002 | Antoniades et al. |
| 2003/0076578 A1 | 4/2003 | Goto et al. |
| 2005/0286905 A1 | 12/2005 | Mohs et al. |
| 2006/0044646 A1 | 3/2006 | Shimizu |
| 2006/0127101 A1 | 6/2006 | Maeda et al. |
| 2006/0209392 A1 | 9/2006 | Caponi et al. |

FOREIGN PATENT DOCUMENTS

| | | |
|---|---|---|
| EP | 585005 A1 * | 3/1994 |
| EP | 0 967 752 | 12/1999 |
| JP | 2001144352 A | 5/2001 |
| WO | WO 96/26581 | 8/1996 |

OTHER PUBLICATIONS

International Preliminary Examination Report for PCT/US01/21471.

Agrawal, Govind P., Fiber-Optical Communication Systems, 2nd Edition, John Wiley & Sons, 1997, pp. 170-175.

Lee et al. A variable gain optical amplifier for metro WDM networks with mixed span losses; a gain-clamped semiconductor optical amplifier combined with a Raman fiber amplifier. 2005 Optical Society of America. OME44. pp. 1-3.

* cited by examiner

OPTICAL TRANSMISSION SYSTEMS INCLUDING OPTICAL AMPLIFIERS AND METHODS OF USE THEREIN

This application is a continuation in part and claims priority from and the benefit of U.S. Provisional Application No. 60/216,114 filed Jul. 6, 2000, which is incorporated herein by reference.

BACKGROUND OF THE INVENTION

The present invention is directed generally to optical systems. More particularly, the invention is directed toward optical transmission systems including amplifying devices, such as optical amplifiers.

The continued growth in traditional communications systems and the emergence of the Internet as a means for accessing data has accelerated demand for high capacity communications networks. Telecommunications service providers, in particular, have looked to wavelength division multiplexing (WDM) to increase the capacity of transmission systems to meet the increasing capacity demands placed on their network infrastructure.

In WDM transmission systems, pluralities of distinct information signals are carried using electromagnetic waves having different wavelengths in the optical spectrum, typically using infrared wavelengths. Each information carrying wavelength can include multiple data streams that are time division multiplexed ("TDM") together into a TDM data stream or a single data stream.

The pluralities of information carrying wavelengths are combined into a "WDM" optical signal that is transmitted in a single waveguide. In this manner, WDM systems can increase the transmission capacity of the network compared to space division multiplexed ("SDM"), i.e., single channel, systems by a factor equal to the number of wavelengths used in the WDM system.

Optical WDM systems were not initially deployed, in part, because of the high cost of electrical signal regeneration/amplification equipment required to compensate for signal attenuation for each optical wavelength throughout the system. However, the development of the erbium doped fiber amplifier (EDFA) provided a cost effective means to amplify optically multiple optical signal wavelengths in the 1550 nm range. In addition, the 1550 nm signal wavelength range coincides with a low loss transmission window in silica based optical fibers, which allowed EDFAs to be spaced further apart than conventional electrical repeaters/regenerators.

Optical amplifiers are deployed periodically, e.g., 40-120 km, throughout the optical system to compensate for attenuation that incurs in a span of optical fiber preceding the amplifier. The amplifiers are operated so that the gain provided by the optical amplifier compensates, or substantially compensates, for the loss in each span. As a result, no net loss or gain of signal power occurs in each span, i.e. Amplifier Gain≅Span Loss, which is referred to as transparent operation.

The use of EDFAs essentially eliminated the need for, and the associated costs of, electrical signal repeater/regeneration equipment to compensate for signal attenuation in many systems. The dramatic reduction in the number of electrical regenerators in the systems, made the installation of WDM systems in the remaining electrical regenerators a cost effective means to increase optical network capacity.

WDM systems have quickly expanded to fill the limited amplifier bandwidth of EDFAs. New erbium-based fiber amplifiers (L-band) have been developed to expand the bandwidth of erbium-based optical amplifiers. Also, new transmission fiber designs are being developed to provide for lower loss transmission in the 1400-1500 nm and 1600-1700 nm ranges to provide additional capacity for future systems.

In addition, Raman fiber amplifiers ("RFA") have been investigated for years and are now being commercially deployed and operated in a network. RFAs offer the potential to exploit a substantial portion of the optical waveguide transmission capacity While optical amplifiers have provided significant benefits by eliminating the need for numerous electrical regenerators, optical amplifiers do have a shortcomings. For example, optical amplifiers often do not provide uniform amplification, or gain, profile over the signal wavelength range. As such, optical amplifiers often will be deployed in combination with gain flattening filters, which provide wavelength specific filtering to produce a more uniform bring about more uniform gain.

In addition, the gain profile of the optical amplifier can vary depending upon the amount of gain, or gain, being provided by the amplifier. In operating system, the amplifier gain is set to compensate signal power attenuation that occurs in a fiber span preceding the amplifier. The attenuation in each span, i.e., the span loss, generally varies from span to span in a system; therefore, the optical amplifiers have to be operated at different gains corresponding to the span loss. However, operation at different gain can introduce gain profile variations that result in signal power variations, which can degrade system performance.

While it is possible to design gain flattening filters and amplifiers for specific span losses, individualized amplifier and filter designs generally are not feasible from a commercial standpoint. As such, amplifiers generally are designed for a nominal gain and gain flattening filters are designed based on that nominal gain. When the amplifiers and filters are deployed in the system, operation of the amplifiers at gains other than the nominal gain will introduce signal power variations into the system.

Alternative designs have been proposed, in which the amplifiers are operated at the designed nominal gain and a variable attenuator is provided proximate the amplifier to introduce additional attenuation into the span. The variable attenuator is controlled, such that the variable attenuator loss plus the span loss is equal to the nominal gain of the amplifier.

The variable attenuator configurations allow the operation of optical amplifiers at designed gains allowing for more uniform gain profiles. However, the introduction of excess gain balanced by excess attenuation introduces additional noise into the system that also degrades system performance. In addition, these alternative designs require that the amplifier be designed to provide high gain that can be attenuated to accommodate various span loss, which can increase overall amplifier and system costs.

The development of higher performance, lower cost communication systems depends upon the continued development of higher performance components and subsystems for use in the system. It is, therefore, essential that optical systems and optical amplifiers be developed having increased performance capabilities to meet the requirements of next generation optical systems.

BRIEF SUMMARY OF THE INVENTION

The apparatuses and methods of the present invention address the above need for improved optical transmission systems and optical amplifiers. Optical transmission systems of the present invention include a plurality of optical amplifiers configured to provide sufficient cumulative signal amplification, or gain, to compensate for cumulative signal attenuation, or loss, in the system. The gain of each individual amplifier is not adjusted to compensate for the loss in a particular span associated with the amplifier. As such, various spans will operate with a net loss or a net gain depending upon whether the amplifier provides more or less gain than the attenuation in the span. Instead, two or more of the amplifiers are operated to provide gain, such that the cumulative gain over those amplifiers compensates for the cumulative loss in those spans. In other words, unlike prior systems, each span in the present invention is not operated transparently, but the cumulative span is transparent.

By allowing net gain and net loss variations, while maintaining cumulative transparency, over a plurality of spans, the system can be operated using optical amplifiers that provide different levels of performance, such as noise figure, gain margin, and spectral gain profile, etc. that can be tailored to achieve a desired network performance level. For example, high gain, high noise figure amplifiers can be replaced by lower gain, lower noise figure amplifiers, which can improve the performance of the system. Net losses incurred in spans, in which lower gain amplifiers were deployed can be offset by operating one or more of the other amplifiers to provide a net gain.

In various embodiments, optical processing nodes, such as transmit and/or receive terminals and optical switching and add/drop devices, are interconnected by a plurality of optical amplifiers to form an optical link between the nodes. The optical link can be operated transparently, while two or more of the optical amplifiers in the optical link are operated to produce net gains and losses in the respective spans.

In operation, the cumulative net gain or loss can be established and monitored, if necessary, such that the cumulative net gain or loss is constrained between a maximum net gain and a maximum net loss range. The cumulative range constraints can be used to prevent the signal channel powers from becoming too high or too low along any span during transmission, while cumulative transparency is maintained at the end of the spans. In general, the performance gain achievable by operating individual amplifiers at net gain and net loss is weighed against the penalty associated with operating the spans with higher or lower signal power than is required to operate transparently.

In addition, the present invention can be used to ameliorate the effects of amplifier failures in the system. For example, the failure of one or more pump sources providing energy to optical amplifying media can result in degraded performance of the amplifier and overall net loss for the span or spans in which the failures occur. In the present invention, the non-failed amplifiers can provide additional redundancy to offset the failure by being configured to operate the corresponding spans at a net gain, and, thereby maintain cumulative transparency over plural spans and/or the link.

The present invention can be embodied using one amplifier type or various combinations of amplifier types. For example, various lumped and/or distributed doped and/or non-linear fiber amplifiers, such as erbium and Raman amplifiers, that can be locally and/or remotely supplied with optical power can be used, as well as other amplifier types. The amplifiers can be deployed in serial and/or parallel stages and in combinations of filters, attenuators, isolators, dispersion compensating devices, and other signal varying devices, as well as various optical processing devices, disposed between amplifier stages and before and/or after the amplifier. The amplifiers can be locally and/or remotely controlled depending upon the system configuration.

The present invention addresses the limitations of the prior art by providing amplifiers and systems that provide increased control and flexibility necessary for higher performance, lower cost optical transmission systems. These advantages and others will become apparent from the following detailed description.

BRIEF DESCRIPTION OF THE DRAWINGS

Embodiments of the present invention will now be described, by way of example only, with reference to the accompanying schematic drawings for the purpose of illustrating present embodiments only and not for purposes of limiting the same:

FIGS. 5a-6 show exemplary depictions of signal power variations along a plurality of spans.

DETAILED DESCRIPTION OF THE INVENTION

Figure 1:
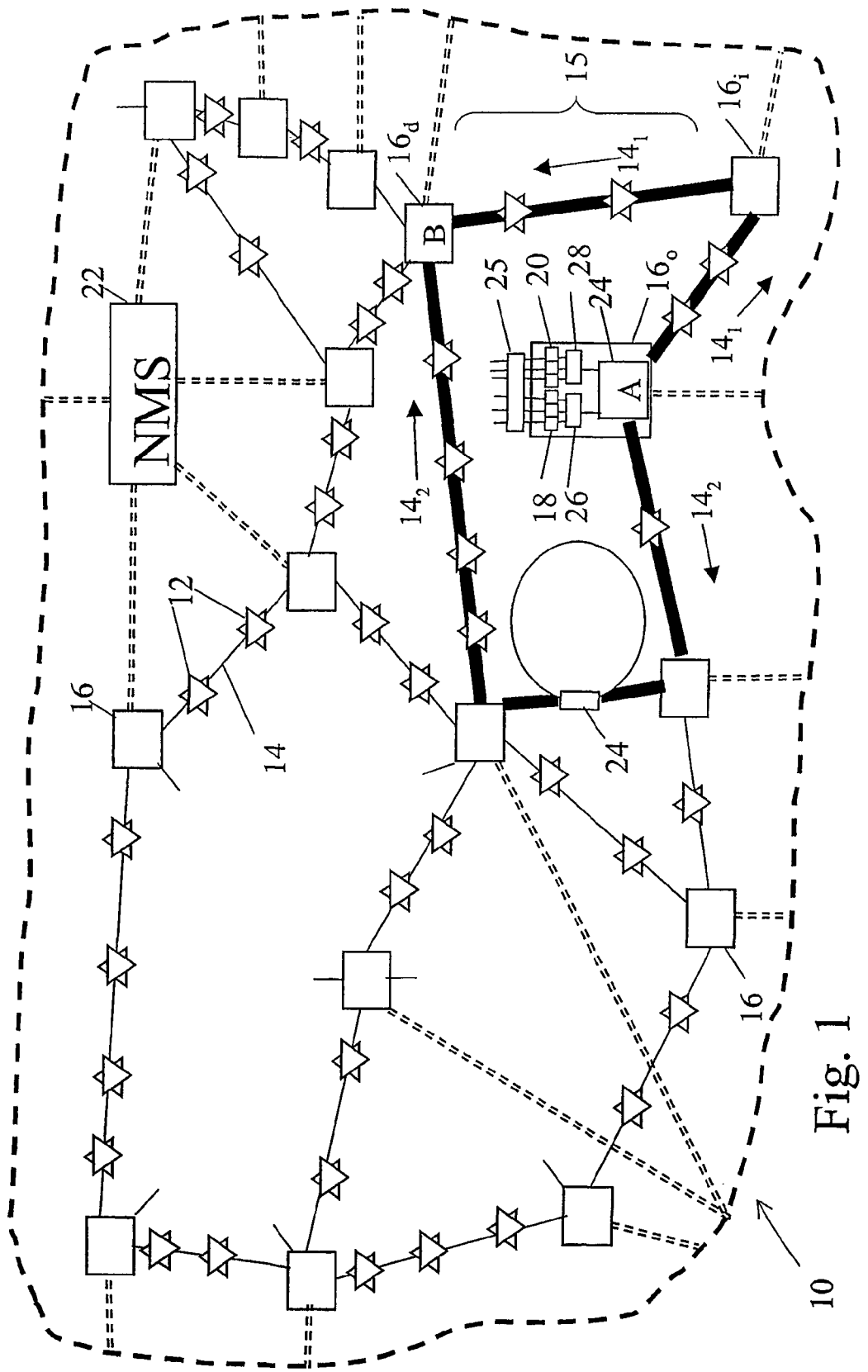
FIGS. 1 and 2 show optical system embodiments.

Optical systems 10 of the present invention include optical amplifiers 12 disposed along an optical path 14 to optically amplify optical signals passing through an optical link 15 between optical processing nodes 16. One or more transmitters 18 can be included in the nodes 16 and configured to transmit information via the optical signals in one or more information carrying signal wavelengths, or signal channels, $\lambda_{si}$ to one or more optical receivers 20 in other nodes 16. The optical system 10 can be configured in multi-dimensional networks (FIG. 1) or in one or more serially connected point to point links 15 (FIG. 2), which can be controlled by a network management system 22.

In various network embodiments, such as in FIG. 1, a signal channel $\lambda_{si}$ can travel multiple paths, e.g., 14$_1$ and 14$_2$, between an origination node 16$_o$ and a destination node 16$_d$. The signal channel also may have to traverse one or more intermediate nodes 16$_i$ between the origination node 16$_o$ and the destination node 16$_d$.

The optical processing nodes 16 may also include one or more other optical processing devices, for example, integrated optical switching devices 24, such as optical add/drop multiplexers and switches/routers/cross-connects. For example, broadcast and/or wavelength reusable, add/drop devices, and optical cross connect switches and routers can be configured via the network management system 22 in various topologies, i.e., rings, mesh, etc. to provide a desired network connectivity.

The deployment of integrated switching devices 24 in intermediate nodes 16$_i$ can provide all-optical interconnections between the transmitters 18 and receivers 20 in the origination node 16$_o$ and the destination node 16$_d$, respectively. In this manner, the use of integrated switching device 24 in the system 10 provides for a distance independent all-optical network, sub-network, or nodal connection.

Figure 2:
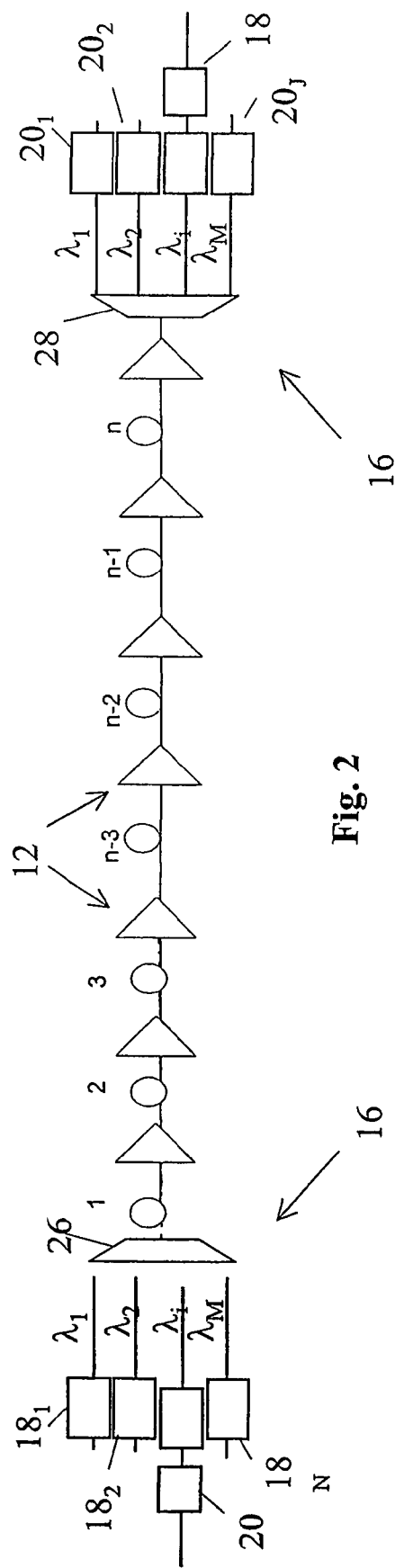

The optical amplifiers 12 and optical processing nodes 16 are referred to generally as network elements. The optical path 14 extending between successive network elements in the system 10 is referred to as a span. Whereas, the optical link 15 extends between successive nodes 16 and will include one or spans depending upon the configuration of the system 10. For example, FIG. 2 shows a point to point optical link 15 including spans 1 through n.

The transmission media can include various guided and unguided media, and is typically optical fiber 14. Currently, the most commonly used optical fiber 14 in optical transmission systems is a single mode fiber, although multiple mode fibers can be used in various applications. The optical fibers 14 can have various dispersion and non-linear properties that affect the transmission properties of the system 10. One or more optical fibers 14 can be disposed to provide multiple optical links 15 between nodes 16 along a common optical path. In addition, each fiber can carry uni- or bi-directionally propagating optical signals depending upon the system 10 configuration.

The optical transmitters 18 and optical receivers 20 are configured respectively to transmit and receive optical signals including one or more information carrying optical signal wavelengths, or signal channels, $\lambda_{si}$. In the present description, the term "information" should be broadly construed to include any type of information that can be optically transmitted including voice, video, data, instructions, etc.

The transmitters 18 used in the system 10 generally will include a narrow bandwidth laser optical source, such as a DFB laser, that provides an optical carrier. The transmitters 18 also can include other coherent narrow or broad band sources, such as sliced spectrum or fiber laser sources, as well as suitable incoherent optical sources as appropriate. Information can be imparted to the optical carrier either by directly modulating the optical source or by externally modulating the optical carrier emitted by the source. Alternatively, the information can be imparted to an electrical carrier that can be upconverted onto an optical wavelength to produce the optical signal. The information can be amplitude, frequency, and/or phase modulated using various formats, such as return to zero ("RZ"), non-return to zero ("NRZ"), differential phase shift keying ("DPSK"), etc., encoding techniques, such as forward error correction ("FEC"), etc., and transmission protocols, such as SONET/SDH, IP, ATM, Ethernet, Fiber Channel, etc.

The optical receiver 22 used in the present invention can include various detection techniques, such as coherent detection, optical filtering and direct detection, and combinations thereof. The receivers 22 can be deployed in modules that have incorporated wavelength selective filters to filter a specific channel from a WDM signal or channel filtering can be performed outside of the receiver module. It will be appreciated that the detection techniques employed in the receiver 22 will depend, in part, on the modulation format used in the transmitter 20. Also, various transmission formats and protocols can be used within a WDM system, as well as in each serial WDM or SDM link of transmitters 18 and receivers 20.

Generally speaking, N transmitters 18 can be used to transmit M different signal wavelengths to J different receivers 20. Also, tunable transmitters 18 and receivers 20 can be employed in the optical nodes 16 in a network, such as in FIG. 1. Tunable transmitters 18 and receivers 20 allow system operators and network architects to change the signal wavelengths being transmitted and received in the system 10 to meet their network requirements. In addition, the transmitters 18 and receivers 20 can employ various feedback loops to control the transmission characteristics of the signals and configuration of the system 10.

The transmitters 18 and receivers 20 also can include various components to perform other signal processing, such as reshaping, retiming, error correction, differential encoding, regeneration, dispersion and distortion compensation, etc. For example, receivers 20 can be connected to the transmitters 18 in back to back configuration as a regenerator, as shown in FIG. 2. The regenerator can be deployed as a 1R, 2R, or 3R regenerator, depending upon whether it serves as a repeater (reshape), a remodulator (reshape & retime), or a full regenerator (reshape, retime, regenerate), respectively.

In a WDM system, the transmitters 18 and receivers 20 can be operated in a uniform manner or the transmission and reception characteristics of the signal channels can be tailored individually and/or in groups. For example, pre-emphasis, optical and/or electrical pre- and post-dispersion and distortion compensation can be performed on each channel or groups of channels.

In FIG. 2, it will be appreciated that the transmitters 18 and receivers 20 can be used in WDM and single channel systems, as well as to provide short, intermediate, and/or long reach optical interfaces between other network equipment and systems. For example, transmitters 18 and receivers 20 deployed in a WDM system can be included on a module that also includes standardized interface receivers and transmitters, respectively, to provide communication with interfacial devices 25, as well as other transmission and processing systems.

Interfacial devices 25, such as electrical and optical cross-connect switches, IP routers, ATM switches SONET ADMs, etc., can be used to provide various signal processing and cross-connect functions at network interfaces. The network interfaces occur at the intersection point to point links and/or networks. When the interfacial devices interconnect point to point links, the network interfaces are in the core of an opaque network as shown in FIG. 2. Whereas, the interfacial devices 25 connect to the periphery of, or edge, of a network, such as metropolitan, access, regional, national, and/or multidimensional all-optical networks, as shown in FIG. 1.

The interfacial devices 25 can be configured to receive, convert, aggregate, groom, and provide information via signaling or otherwise in one or more various protocols, encoding schemes, and bit rates to the transmitters 18, and perform the converse function for the receivers 20. For example, interfacial devices 25, that perform electrical processing, such as electrical cross connect switches, IP routers, etc., could be used to aggregate STS-1 traffic up to OC-48 through OC-768 or OC-768 traffic could be dissembled and groomed at lower bit rates.

Interfacial devices 25 with optical switching provide an automated patch panel function interconnecting link and network interfaces to provide flexibility in wavelength and path assignment for signal channels traversing the interface. It will be appreciated that any signal can be assigned different WDM wavelengths at an interface, which is sometimes referred to as wavelength conversion or grooming. Similarly, protection and restoration switching at the interface does not require that the same WDM wavelength be used on each side of the interface or path.

The interfacial devices 25 can have electrical input/output interface that can be connected to other networks or interfacial devices 25. In addition, the interfacial devices 25 can include optical input/output ports, such as integrated WDM transmitters 18 and receivers 20 and/or short, intermediate, and/or long reach optical interfaces, typically operating in the 1300 nm or 1550 nm range.

The interfacial devices 25 also can be used to provide protection and restoration switching in various nodes 16 depending upon the configuration. Linear and mesh protection restoration schemes can be implemented using the interfacial devices 25. For example, various protection schemes, such as 2 & 4 fiber BLSR, UPSR, 1+M, M:N, etc. can be used alone or in combination with various partial and full mesh restoration schemes.

Various types of optical switching devices 24, both optical switches and OADMs, can be integrated into the network to provide all-optical networking functionality at the nodes 16 and the deployment of distance independent networks. The switching devices 24 allow for integrated optical switching, adding, dropping, and/or termination of signal channels from multiple paths 14 entirely in the optical domain without the need for receivers 20 and transmitters 18 to perform electrical conversions, as required when using interfacial devices 25 to perform these functions. As such, signal channels can optically pass through intermediate nodes $16_i$ between the origin nodes $16_o$ and destination nodes $16_d$ channels, optically bypassing the need for transmitters 18 and receivers 20 at the intermediate nodes $16_i$. Optical bypass at nodes 16 including switching devices 24 provides transparency through the node that allows all-optical express connections to be established between non-adjacent origin and destination nodes in a network.

As depicted in FIG. 1, integrated switching device 24 can be deployed at origination nodes $16_o$ and destination nodes $16_d$ with transmitters 18 and receivers 20, respectively. The use of integrated switching device 24 in this configuration allows for transmission and reception of signal channels $\lambda_{si}$ without terminating the optical path using receivers 20 and transmitter 18 as is the case in point to point links, as shown in FIG. 2. Thus, transmitters 18 in the origination nodes $16_o$ can communicate with receivers 20 in via the optical paths 14 through the integrated switching devices 24 without having to convert information between optical signals and electrical signals merely to pass the information through the nodes 16.

It will be appreciated that signal channels that are switched onto a common path by the switching devices 24 from different paths can have different properties, such as optical signal to noise ratio. Conversely, signal channels entering the switching devices 24 from a common path and exiting the devices 24 via different paths may require that the signal channels exit with different properties, such as power level. As such, signal channels may have different span loss/gain requirements or tolerances within the link 15.

The switching devices 24 can be configured to process individual signal channels or signal channel groups including one or more signal channels. The switching devices 24 also can include various wavelength selective or non-selective switch elements, combiners 26, and distributors 28. The transmitters 18 and receivers 20 can be configured to transmit and receive signal channels dynamically through the switch elements or in a dedicated manner exclusive of the switch elements using various combiners 26 and distributors 28. The OADMs can include wavelength reusable and non-reusable configurations. Similarly, the switching devices 24 can be configured to provide multi-cast capability, as well as signal channel terminations.

The switching devices 24 can include various configurations of optical combiners 26 and distributors 28, such as multiplexers, demultiplexers, splitters, and couplers described below, in combination with various switch elements configured to pass or block the signals destined for the various other nodes 12 in a selective manner. The switching of the signals can be performed at varying granularities, such as line, group, and channel switching, depending upon the degree of control desired in the system 10.

The switch element can include wavelength selective or non-selective on/off gate switch elements, as well as variable optical attenuators having suitable extinction ratios. The switch elements can include single and/or multiple path elements that use various techniques, such as polarization control, interferometry, holography, etc. to perform the switching and/or variable attenuation function. The switching devices can be configured to perform various other functions, such as filtering, power equalization, dispersion compensation, telemetry, channel identification, etc., in the system 10.

Various non-selective switch elements can be used in present invention, such as mechanical line, micro-mirror and other micro-electro-mechanical systems ("MEMS"), liquid crystal, holographic, bubble, magneto-optic, thermo-optic, acousto-optic, electro-optic ($LiNbO_3$), semiconductor, erbium doped fiber, etc. Alternatively, the switch elements can employ fixed and tunable wavelength selective multiport devices and filters, such as those described below. Exemplary switching devices 24 are described in PCT Application No. PCT/US00/23051, which is incorporated herein by reference.

Optical combiners 26 can be provided to combine optical signal channels $\lambda_{si}$ from different optical paths onto a common path, e.g. fiber. Likewise, optical distributors 28 can be provided to distribute optical signals from a common path to a plurality of different optical paths. The optical combiners 26 and distributors 28 can include wavelength selective and non-selective ("passive") fiber, planar, and free space devices, which can be polarization sensitive or insensitive. Passive or WDM couplers/splitters, circulators, dichroic devices, prisms, gratings, etc. can be used alone, or in combination with various tunable or fixed, high, low, or band pass or stop, transmissive or reflective filters, such as Bragg gratings, Fabry-Perot, Mach-Zehnder, and dichroic filters, etc. in various configurations of the optical combiners 28 and distributors 28. Furthermore, the combiners 26 and distributors 28 can include one or more serial or parallel stages incorporating various devices to multiplex, demultiplex, and multicast signal wavelengths $\lambda_{si}$ in the optical systems 10.

As shown in FIGS. 1 and 2, optical amplifiers 12 can be disposed along the transmission fiber 14 to overcome attenuation in the fiber 14 and proximate the optical processing nodes 16 to overcome loss associated with the nodes 16, as required. The optical system 10 can include one or more amplifier types, such as various lumped and/or distributed doped and/or non-linear fiber amplifiers, such as erbium and Raman amplifiers, that can be supplied locally and/or remotely with optical power, as well as other amplifier types, e.g. semiconductor. The amplifiers 12 can be deployed in serial and/or parallel stages $12_i$ and in combination with filters, attenuators, isolators, dispersion compensating devices, and other signal varying devices, as well as add/drop and other optical processing devices, disposed between amplifier stages $12_i$ and before and/or after the amplifier 12. Examplary amplifiers 12 are described in U.S. Pat. No. 6,115,174, which is incorporated herein by reference.

In addition, the amplifiers 12 can be locally and/or remotely controlled using various automatic gain and/or power control schemes depending upon the configuration of the system 10. For example, U.S. Pat. No. 6,236,487, which is incorporated herein by reference, describes various local control schemes, as well as combination with remote control schemes to control a chain of optical amplifiers.

Figure 3:
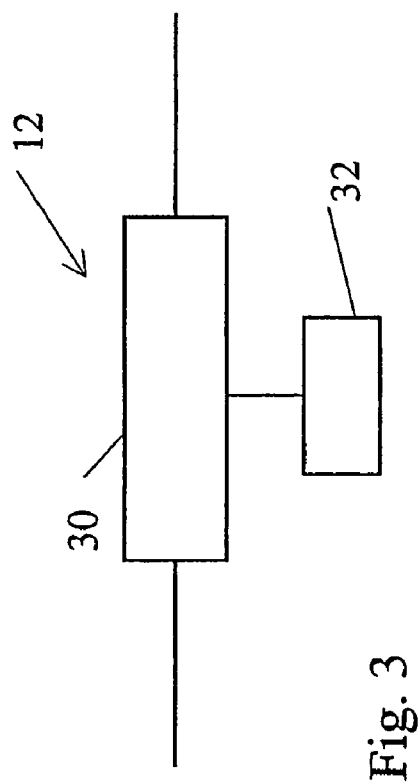
FIGS. 3 and 4 show exemplary optical amplifier embodiments.

As shown in FIG. 3, the optical amplifiers 12 generally include an optical amplifying medium 30 supplied with power from an amplifier power source 32. Optical signals passing the amplifying medium are optically amplified by the medium 30 using energy supplied from the power source 32.

Figure 4:
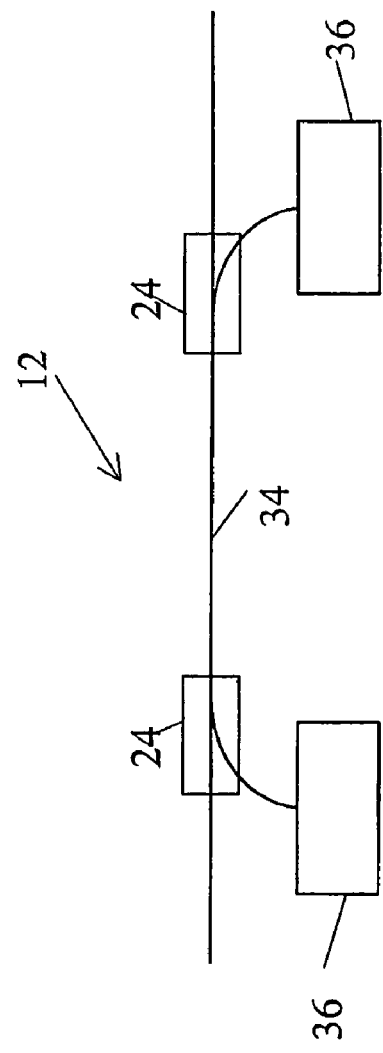

As shown in FIG. 4 and for the sake of clarity, the optical amplifier 12 will be described further in terms of an amplifying fiber 34 supplied with power in the form of optical, or "pump", energy from one or more pump sources 36. However, it will be appreciated that optical amplifiers 12 including other amplifying media 30, i.e., semiconductor, etc., may be substituted with appropriate modification, as previously mentioned.

The amplifying fiber 34 will generally be a doped fiber and/or a fiber suitable for producing non-linear interactions, such as stimulated Raman scattering, that can be used to amplify optical signals. The optical fiber 34 will be supplied with optical energy in one or more pump wavelengths $\lambda_{pi}$ that is used to amplify the signal wavelengths $\lambda_{si}$ passing through the amplifying fiber 34. One or more dopants can be used in the doped amplifying fiber 34, such as Er, other rare earth elements, e.g., Yb and Nd, as well as other dopants. The doped and Raman amplifying fibers 34 can be distributed as part of the transmission fiber 14, or concentrated/lumped at discrete amplifier sites, and can be locally or remotely pumped with optical energy.

The amplifying fiber 34 can have the same or different transmission and amplification characteristics than the transmission fiber 14. For example, dispersion compensating, zero and non-zero dispersion shifted, non-dispersion shifted ("standard"), polarization maintaining fiber and other fiber types can be intermixed as or with the transmission fiber 14 depending upon the system configuration. Thus, the amplifying fiber 34 can serve multiple purposes in the optical system, such as performing dispersion compensation and different levels of amplification of the signal wavelengths $\lambda_i$.

The pump source 36 can include one or more narrow band or broad band optical sources 38, each providing optical power in one or more pump wavelength ranges designated by center pump wavelengths $\lambda_{pi}$ and including one or more modes. The optical sources 38 can include both coherent and incoherent sources, which can be wavelength stabilized and controlled by providing, for example, a Bragg grating or other wavelength selective, reflective element in a pig tail fiber of the source. A portion of the pump power can be tapped to an O/E converter and an optical source controller employed to provide feedback control over the optical source.

Various configurations of combiners 26, as previously described, can be used to combine pump wavelengths $\lambda_{pi}$ for introduction in the amplifying fiber 34. Pump energy can be supplied to the amplifying fiber 34, either counter-propagating and/or co-propagating with respect to the propagation of the signal wavelengths $\lambda_i$. It will be appreciated that in a bi-directional amplifier 12, the pump wavelengths $\lambda_{pi}$ will be counter-propagating relative to signal wavelengths $\lambda_{si}$ in one direction as well as co-propagating relative to signal wavelengths $\lambda_{si}$ in the other direction.

In the present invention, the gain of each individual amplifier 12 in the link 15 is not adjusted to compensate for the loss in an associated span, i.e., Amplifier Gain≠Span Loss. In other words, various spans in the system 10 are not operated at transparency, but with a net loss or a net gain depending upon whether the amplifier 12 provides gain that is greater than or less than their respective span losses. However, the amplifiers 12 in the optical link 15 are operated, such that the cumulative gain of the amplifiers 12 compensates for the cumulative loss in the link 15. Unlike prior systems, each span in the present invention is not operated transparently, but multiple spans are operated so that the cumulative span is operated transparently.

By allowing net gain and net loss variations in individual spans, but maintaining cumulative transparency, over a plurality of spans, the system can be operated using optical amplifiers that provide different levels of amplifier and system performance, such as noise figure, gain margin, and spectral gain profile, etc. For example, high gain, high noise figure amplifiers can be replaced by lower gain, lower noise figure amplifiers, which can improve the performance of the system. Net losses incurred in spans, in which lower gain amplifiers were deployed can be offset by operating one or more of the other amplifiers to provide a net gain.

While various types of optical amplifiers can be used in the system as previously described, each type of amplifier does not have the same gain versus other amplifier performance characteristics, such as noise figure, spectral gain profile, etc. For example, distributed amplifiers generally can provide a lower noise figure for a given amount of gain than is provided using a concentrated amplifier, assuming comparable levels of amplified spontaneous emissions are produced by both amplifiers.

The operation of spans with net gain and loss effectively creates a virtual amplifier spacing, in which the gain of the amplifiers in the plural spans is based not on the actual span losses in a network. Instead, the gain of the amplifiers is established based on required cumulative gain required to overcome the cumulative span loss and various type of amplifiers and amplifier gain required to achieve a desired level of performance in the system.

In various embodiments, two or more of the optical amplifiers 12 in the optical link 15 are operated such that the signal power at the output of the amplifier 12 varies from a nominal output signal power. The respective spans are operated with net gains and losses, while the link 15 is operated transparently and the signal power at the end of the link 15 is equal to the nominal output signal power.

In the present invention, plural spans can be operated, such that the nominal signal power at the input to the plural spans can be different from the nominal signal power at the output of the plural spans. For example, if optical signals are transmitted or launched at different nominal signal power than the signal are received or otherwise processed or when varying fiber types are used. In those embodiments, cumulative transparency is provided relative to the nominal signal input and output powers.

Figures 5A, 5B:
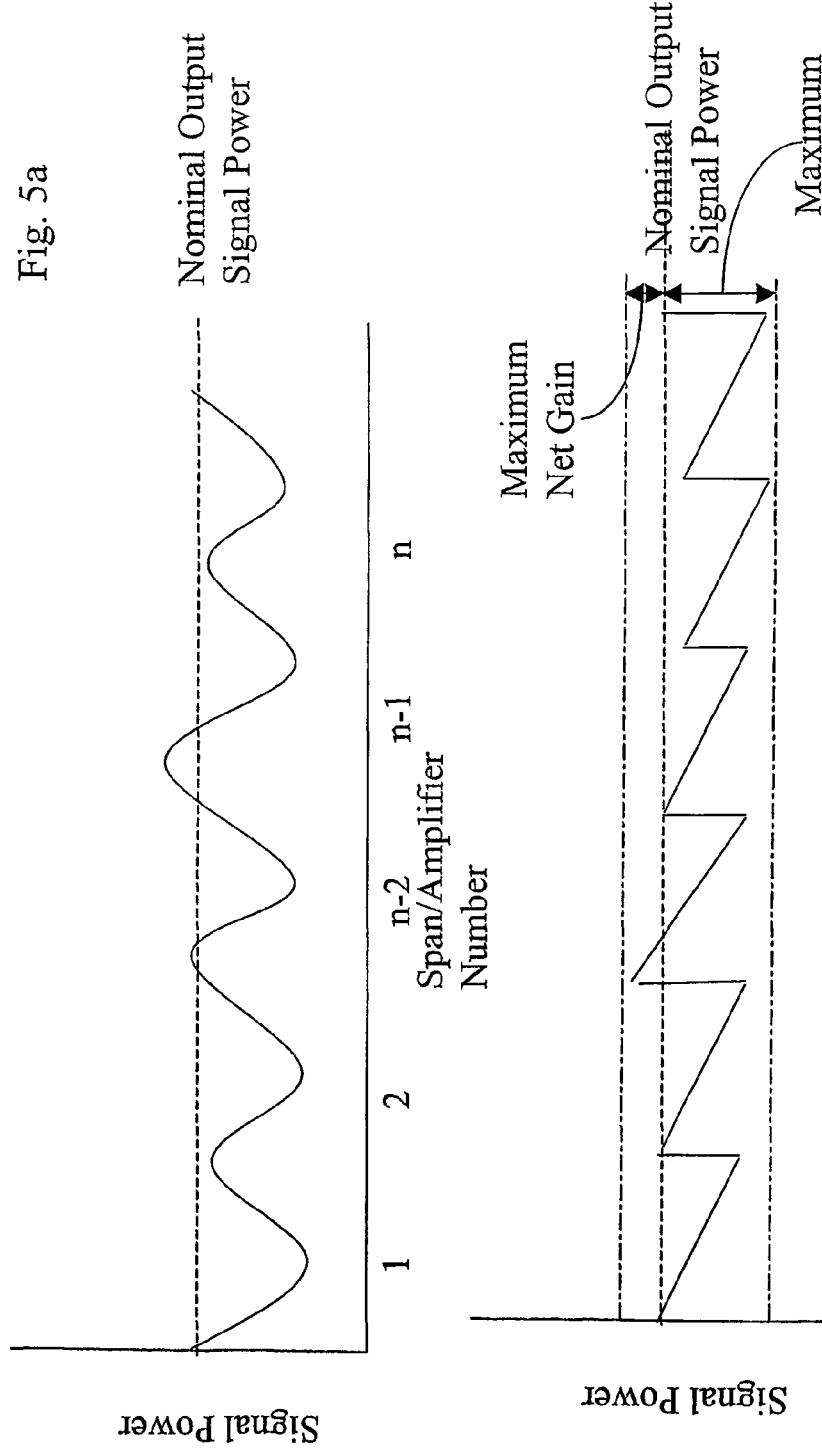

As shown in FIGS. 5a and 5b, the maximum and minimum signal channel power varies from span to span. However, at span n, the signal power at the output of the optical amplifier is at the nominal output signal power to provide cumulative transparency through the plural spans.

As further shown in FIG. 5b, in various embodiments, the cumulative net gain or loss can be established and monitored, if necessary, such that the cumulative net gain or loss is constrained between a maximum net gain and a maximum net loss range during transmission. The cumulative range constraints can be used to prevent the signal powers from becoming too high or too low along any span during transmission, while cumulative transparency is maintained at the end of the spans. The maximum net gain and maximum net loss values can be set based on various factors, such as optical signal to noise ratio and non-linear interaction limits.

Figure 6:
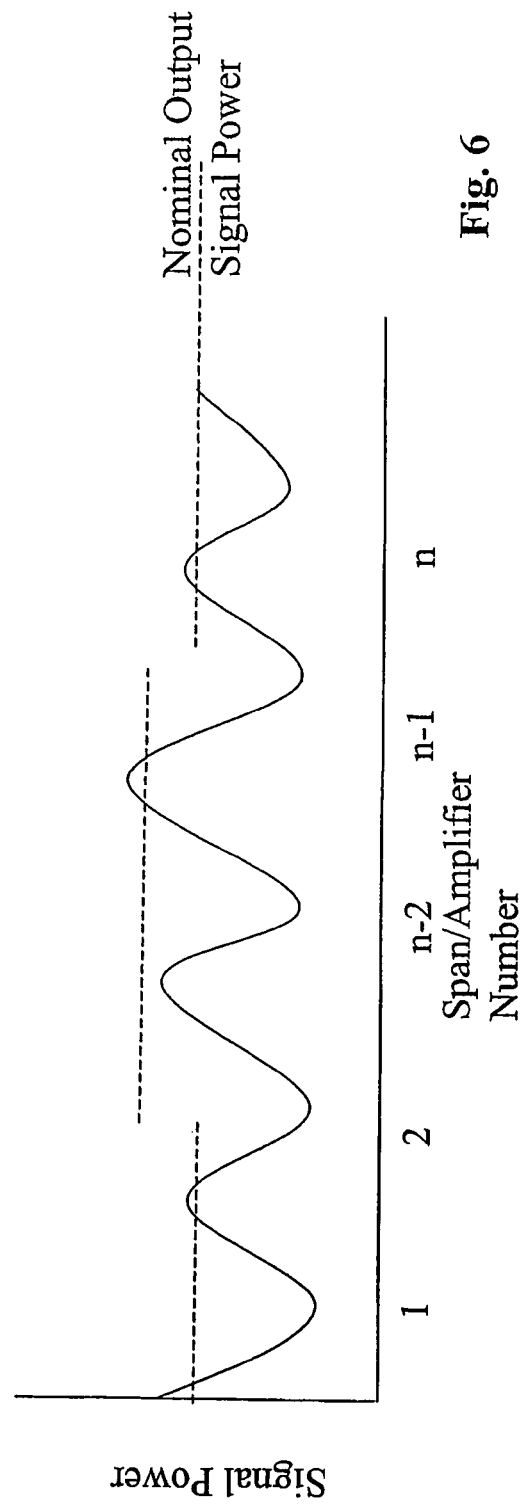

As shown in FIG. 6, in various embodiments employing multiple fiber types, it is possible to vary the nominal output signal power depending upon the fiber type. The present invention allows for net gain or loss variations to be propagated through multiple fiber types to more evenly control the signal power profile through a plurality of spans/amplifiers.

While FIG. 5a-6 depict signal channel power profile of a single or average channel along the span, it will be appreciated that each signal channel $\lambda_i$ being transmitted through the system 10 can have the same or different profile as some or all of the other channels. For example, in some spans all channels can experience a net gain or net loss of signal power; whereas, in other spans, different channels can experience net gain, net loss, and transparent operation.

Cumulative transparency can be established as a condition to be achieved at the end of the link 15 or at some intermediate point in the link 15 after a plural number of spans. Additional rules can be generated to constrain the maximum number of spans over which a net gain and/or net loss can be maintained in the link 15.

In operation, signals at the output of each amplifier can be at different power levels, which is contrary to prior art systems that provide for constant signal powers at the amplifier output. Each amplifier 12 can be configured to operate at a fixed and programmable signal output power set point, which can be manually or automatically set, either locally or remotely, such as via the NMS 24. The system 10 also can be used with different fiber types that can support different signal power levels within the system 10.

In practice, cumulative transparency can be taken into account in the design of the system 10. For example, it may be more desirable to place higher gain amplifiers in some spans to allow lower gain amplifiers in other spans. Likewise, various types of amplifiers 12, such as concentrated and distributed doped and Raman fiber amplifiers, can be deployed effectively to provide cumulative transparency, but not necessarily transparency over every span, or "span transparency".

In addition, the present invention can be used to ameliorate the effects of amplifier failures in the system. For example, the failure of one or more pump sources providing energy to optical amplifying media can result in degraded performance of the amplifier and overall net loss for the span or spans in which the failures occur. In the present invention, the non-failed amplifiers can provide additional redundancy to offset the failure by being configured to operate the corresponding spans at a net gain, and, thereby maintain cumulative transparency over plural spans and/or the link.

In various embodiments, the gain provided by each amplifier can be controlled locally using various gain and power control schemes. In addition, control over multiple spans can be provided to allow the gain or power set points to be reconfigured manually or automatically via local or remote network management to adjust for variations in the performance of plural spans, so as to maintain cumulative transparency in the system 10.

Generally, the network management system 22 provides for management at the network element level and at the network level. The network management system 22 can include software that is run on dedicated or shared processors provided in, for example, stand-alone or network computers, such as at the network or network element level, that access the software on a fixed or removable dedicated or shared memory or data storage devices, such as compact or floppy discs, hard drives, read-only memory, etc. In addition, the NMS 22 can include software that is resident in a central processor memory and executed by the central processor, such as in network elements.

The present invention can be implemented using software implemented at various levels in the network management system 22. For example, the network management system 22 can include a network planning software application that determines the amplifier gain required for amplifier 12 provided along the plural spans being planned based on the cumulative loss calculated from the individual span losses. To further the example, the network planning application can specify the type of amplifier 12 to install in the network to provide a desired level of performance and cost based on the individual and cumulative span losses. The selection of amplifiers 12 can be governed by various rules pertaining to the nominal signal powers, maximum net gain, maximum net loss, etc.

Generally, the NMS 22 can include a computer readable medium that contains a set of instruction that when executed adjusts the gains amplifier of the optical amplifiers provided along the spans to compensate for the cumulative loss in the plurality of spans. In addition, the NMS 22 can adjust the gain of at least two of the optical amplifiers to provide net gain and/or net loss in those individual spans. The instructions can be executable from the network element and/or the network levels. For example, the nodes 16 can include NMS 22 processors that controls the gain set points for some or all of the amplifiers 12 in the links 15 connecting to the nodes 16. In addition, the nodes 16 can send instructions to processors in the individual amplifiers via a system supervisory channel to perform the amplifier gain adjustments.

The impact of cumulative transparency in an all-optical network, sub-network, or nodal connection will depend upon the variations in signal characteristics of the signal channels travelling diverse paths. In various embodiments, the maximum net loss of a span can be defined based on various characteristics, OSNR, accumulated dispersion, non-linear interactions, etc., as the signal channels traverse the all-optical portion of the network.

Cumulative transparency can be extended from a signal channel origin node $16_o$ to the destination node $16_d$ through one or more transparent intermediate nodes $16_i$, when all-optical switching devices 24 are deployed in the intermediate nodes $16_i$. Cumulative transparency can be applied on any number of bases from individual channels up to all channels in the system 10 over two or more spans within a link or one or more links.

Unlike point to point link embodiments, in which links are defined by the origination and termination of optical signals, cumulative transparency can be defined between any two points in the network. When cumulative transparency is defined over multiple links, each link may be operated at a net gain or net loss depending upon the characteristics of the links. For example, links that include larger core fibers may be operated at higher signal channel powers than links containing smaller core fibers. As such, the signal channel power launched into one link may be different from the signal channel power exiting the link and entering another link. Alternatively, the signal channel power can exit the fiber at the same power as it was launched, but the node 16 can be operated at a different power level than any of the links connected to the node 16.

It will be appreciated that the present invention provides for optical systems with improved performance. Those of ordinary skill in the art will further appreciate that numerous modifications and variations that can be made to specific aspects of the present invention without departing from the scope of the present invention. It is intended that the foregoing specification and the following claims cover such modifications and variations.

What is claimed is:

1. A method of recovering from a failure of at least one pump sources in an amplifier in an optical communications system, comprising:

providing first optical amplifiers having a first maximum gain and first noise figure and second optical amplifiers having a second maximum gain greater than the first maximum gain and a second noise figure greater than the first noise figure;

provisioning first optical amplifiers discretely along an optical path for at least one span having a span losses that exceeds the first maximum gain;

provisioning second optical amplifiers discretely along the optical path to compensate for span losses along the optical path;

controlling the second optical amplifiers to provide gain that substantially compensates for span losses associated with the second optical amplifiers and the span losses exceeding the first maximum gain of the first optical amplifiers; and controlling the second optical amplifiers to provide gain that compensates for a failure of at least one pump in the first optical amplifiers.

2. The method of claim 1, wherein:

provisioning includes provisioning first optical amplifiers discretely along an optical path for all spans having span losses that are less than the first maximum gain plus a net loss;

provisioning second optical amplifiers discretely along the optical path for all spans having span losses that exceed the first maximum gain plus the net loss.

3. The method of claim 2, further comprising determining the net loss based on maximizing the number of first optical amplifiers in the link.

4. The method of claim 2, further comprising determining the net loss based on maintaining a minimum power in the optical path.

5. The method of claim 2, further comprising determining the net loss based on maintaining a cumulative gain margin aver the optical path.

6. The method of claim 2, wherein providing includes providing first and second optical amplifiers configured to reduce the cumulative noise figure of the plurality of optical amplifiers, while maintaining the cumulative gain.

* * * * *